United States Patent
Mizui (10) Patent No.: US 6,623,386 B1
(45) Date of Patent: Sep. 23, 2003

(54) OIL-HYDRAULIC CIRCUIT OF BELT-TYPE CONTINUOUS VARIABLE SPEED-CHANGE TRANSMISSION

(75) Inventor: Hiroyuki Mizui, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/644,683

(22) Filed: Aug. 24, 2000

(30) Foreign Application Priority Data

Aug. 25, 1999 (JP) .......................................... 11-237821

(51) Int. Cl.$^7$ .............................................. F16H 61/00
(52) U.S. Cl. .......................................... 474/28; 477/45
(58) Field of Search .............................. 477/45, 48, 46; 474/18, 28

(56) References Cited

U.S. PATENT DOCUMENTS

| | | | | |
|---|---|---|---|---|
| 5,383,812 A | * | 1/1995 | Tibbles | 474/28 |
| 5,665,023 A | * | 9/1997 | Aoki et al. | 477/48 |
| 5,720,691 A | * | 2/1998 | Ogawa et al. | 477/45 |
| 5,888,168 A | * | 3/1999 | Niiyama et al. | 477/49 |
| 6,110,062 A | * | 8/2000 | Fujikawa | 474/28 |

FOREIGN PATENT DOCUMENTS

JP 2848177 B2 11/1998

* cited by examiner

Primary Examiner—Thomas R. Hannon
Assistant Examiner—Vicky A. Johnson
(74) Attorney, Agent, or Firm—Birch, Stewart, Kolasch & Birch, LLP (57) ABSTRACT

An oil-hydraulic circuit of a continuous belt variable speed-change transmission including primary and secondary variable pulleys, in which at the time when a failure occurs in a solenoid valve, the line pressure of a necessary minimum level is ensured through increasing the oil-hydraulic operating fluid supplied to a secondary pulley. On the other hand, the discharge side of a regulator valve and a primary pulley are maintained in a state of mutual communication to thereby make the speed-change ration equal to or smaller than 1. Also, when the oil pressure supplied to the secondary pulley has increased up to a prescribed, or higher than prescribed level, this oil pressure that is supplied thereto is reduced by means of a second outlet valve. As a result of this, in the oil-hydraulic circuit, even when a failure occurs in the control circuit, the safety of driving of the vehicle is reliably ensured with a simple construction of the oil-hydraulic circuit.

9 Claims, 3 Drawing Sheets

31a  primary cylinder
41a  secondary cylinder
63   regulator valve
64   speed-change-ratio controlling valve
81,82 solenoid valve
87   first outlet valve
90   second outlet valve

OIL-HYDRAULIC CIRCUIT OF BELT-TYPE CONTINUOUS VARIABLE SPEED-CHANGE TRANSMISSION

BACKGROUND OF THE INVENTION

1. Field of the Invention

The present invention relates to an oil-hydraulic circuit of a belt-type continuous variable speed-change transmission.

2. Description of the Related Art

A belt-type continuous variable speed-change transmission generally is so arranged as to stretch a belt over both a primary pulley connected to the input shaft and a secondary pulley connected to the outlet shaft. By increasing and decreasing oil pressure of the respective cylinders of those pulleys and by causing a relative change in the respective groove widths of such pulleys, the transmission causes a change in the speed. As a conventional control apparatus for use on this belt-type continuous variable speed-change transmission, there is, for example, the one that is disclosed in Japanese Patent No. 2848177.

However, in this conventional control apparatus for use on the belt-type continuous variable speed-change transmission, to provide for a simple case where the first or the second control valve is not functioning properly, the third control valve and the speed-change-limiting valve must be additionally provided. Therefore, there exists the problem that the cost of the product inconveniently rises due to an increase in the number of parts.

SUMMARY OF THE INVENTION

The present invention has been made in order to solve the above-described problems and has an object to provide an oil-hydraulic circuit of a belt-type continuous variable speed-change transmission, in which, when a failure occurs in the control circuit, the safety of travel of the vehicle is reliably ensured with a simple construction of the oil-hydraulic circuit to thereby enable the simplification of the oil-hydraulic circuit and the reduction in the cost.

To attain the above object, in the oil-hydraulic circuit of a belt-type continuous variable speed-change transmission according to the first aspect of the invention, there is provided a fail-safe element that, when having detected a failure of the first control element, second control element, or operation-controlling element, causes an increase in the oil-hydraulic operating fluid supplied to the secondary cylinder and simultaneously causes the operating oil pressure regulated by the pressure-regulating element to continue to be supplied to the primary cylinder.

Accordingly, even when the failure-detecting element has detected a failure, the supply of the operating oil pressure-regulated by the pressure-regulating element to the primary cylinder continues to be performed. Therefore, oil-hydraulic operating fluids that are the same high pressure are supplied to the secondary cylinder and to the primary cylinder. However, because the pressure-receiving area of the primary cylinder is made greater than that of the secondary cylinder, the change-of-speed ratio is made to be at a value equal to or smaller than 1. Therefore, even during high-speed travel, the engine is prevented from having too rapid revolution.

In the oil-hydraulic circuit of a belt-type continuous variable speed-change transmission according to the second aspect of the invention, oil-pressure-reducing means is disposed in the oil passage between the pressure-regulating element and the primary cylinder, the oil-pressure-reducing means reducing the oil pressure when this oil pressure within the oil passage has become equal to or higher than a prescribed value. Accordingly, the oil-hydraulic operating fluid pressure regulated by the pressure-regulating element and supplied to the secondary cylinder is ensured to be at the necessary minimum pressure level enabling the prevention of belt slippage. And accordingly, the loss of the driving power for the oil pump can be decreased. Accordingly, even at the time of a failure, it is possible to achieve reduction in the consumption of fuel.

In the oil-hydraulic circuit of a belt-type continuous variable speed-change transmission according to the third aspect of the invention, the oil-pressure-reducing means is disposed on the operating oil passage between the speed-change-ratio-controlling element and the primary cylinder. Accordingly, an unnecessary increase in the line pressure is prevented and, at the same time, the level of the oil-hydraulic operating fluid supplied to the primary cylinder is reliably prevented from becoming equal to or higher than that corresponding to a prescribed value.

In the oil-hydraulic circuit of a belt-type continuous variable speed-change transmission according to the fourth aspect of the invention, the oil-pressure-reducing means includes a first outlet valve disposed in an operating oil passage between the pressure-regulating element and the speed-change-ratio-controlling element and a second outlet valve disposed between the speed-change-ratio-controlling element and the primary cylinder, wherein the outlet pressure of the first outlet valve is set to be at a level higher than that of the second outlet valve. Accordingly, in the case where even though the first control element, second control element, and operation-controlling element are operating normally, line pressure equal to or higher than the set outlet pressure of the first outlet valve occurs in the operating oil passage between the pressure-regulating element and the speed-change-ratio-controlling element due to the sticking of the pressure-regulating element's moving elements, etc., it becomes possible to reduce the resulting oil pressure through the operation of the first outlet valve. On the other hand, even when the first control element, second control element, or operation-controlling element malfunctions with the result that the line pressure has become high in level, the oil-hydraulic operating fluid that is supplied at that time is decreased through the second outlet valve. Therefore, an unnecessary increase in the line pressure is prevented.

In the oil-hydraulic circuit of a belt-type continuous variable speed-change transmission according to the fifth aspect of the invention, the outlet passage of the oil-pressure-reducing means is connected to a lubrication passage. Accordingly, at the time of a failure, the pressure of oil-hydraulic operating fluid supplied to the secondary cylinder is increased, and the outlet of operating fluid from the pressure-regulating element is decreased, thereby possibly causing deficiency in lubrication. However, because the operating oil going from the oil-pressure-reducing means is supplemented to the lubrication passage via the outlet passage, it is possible to prevent the movement seizure of the portions where lubrication is necessary.

In the oil-hydraulic circuit of a belt-type continuous variable speed-change transmission according to the sixth aspect of the invention, the fail-safe element controls the pressure-regulating element so as to cause an increase in the oil-hydraulic operating fluid supplied to the secondary cylinder and controls the speed-change-ratio-controlling valve so as to cause the operating oil pressure regulated by the pressure-regulating element to continue to be supplied to the primary cylinder. Accordingly, by controlling the pressure-regulating element and speed-change-ratio-controlling element, the oil-hydraulic operating fluid supplied to the secondary cylinder is reliably increased while the operating oil that is pressure-regulated by the pressure-regulating element continues to be supplied to the primary cylinder.

In the oil-hydraulic circuit of a belt-type continuous variable speed-change transmission according to the seventh aspect of the invention, the pressure-regulating element is constructed so that, as the first control element operates less, the oil-hydraulic operating fluid supplied to the secondary cylinder increases, the speed-change-ratio-controlling valve is constructed so that, as the second control element operates less, the oil-hydraulic operating fluid pressure-regulated by the pressure-regulating element is supplied to the primary cylinder in greater amounts, and, when the failure-detecting element has detected a failure, the fail-safe element causes a reduction in the amount of operation of the first control element and that of the second control element. Accordingly, with the use of such a simple construction as to decrease the amount of operation of the first and the second control element, the oil-hydraulic operating fluid supplied to the secondary cylinder is reliably increased while the operating oil pressure-regulated by the pressure-regulating element can continue to be supplied to the primary cylinder.

In the oil-hydraulic circuit of a belt-type continuous variable speed-change transmission according to the eighth aspect of the invention, the first control element is constructed with a first electromagnetic valve that discharges a control pressure according to the electricity supplied from the operation-controlling element, the second control element is constructed with a second electromagnetic valve that discharges the control pressure according to the electricity supplied from the operation-controlling element, the pressure-regulating element is constructed with a pressure-regulating valve, the speed-change-ratio-controlling valve is constructed with a speed-change-ratio-controlling valve, whereby the control pressure discharged from the first electromagnetic valve is led to one side of the pressure-regulating valve via a first operating-oil passage, with the result that the pressure-regulating valve is controlled according to the control pressure from the first electromagnetic valve while the control pressure discharged from the second electromagnetic valve is led to one side of the speed-change-ratio-controlling valve via a second operating-oil passage, with the result that the speed-change-ratio-controlling valve is controlled according to the control pressure from the second electromagnetic valve, and the fail-safe element includes a first urging-force generating element that is disposed on the other side of the pressure-regulating valve and that generates an urging force resisting the control pressure of the first electromagnetic valve which, as the control pressure from the first electromagnetic valve decreases, increases the oil-hydraulic operating fluid supplied by the pressure-regulating valve to the secondary cylinder, and a second urging-force generating element that is disposed on the other side of the speed-change-ratio-controlling valve and that generates an urging force resisting the control pressure of the second electromagnetic valve which, as the control pressure from the second electromagnetic valve decreases, increases the supply to the primary cylinder of the operating oil pressure-regulated by the pressure-regulating valve. Accordingly, when a failure occurs, the first urging-force generating element causes the pressure-regulating valve to operate so that the oil-hydraulic operating fluid supplied to the secondary cylinder is increased, while the second urging-force generating element causes the speed-change-ratio-controlling valve to operate so that the operating oil pressure-regulated by the pressure-regulating element and supplied to the primary cylinder may continue to be supplied thereto. As a result of this, it is possible to simplify the oil-hydraulic circuit and reduce the cost without separately providing a special control valve for fail-safe operation.

DESCRIPTION OF THE PREFERRED EMBODIMENT

An embodiment of the present invention will hereafter be explained in detail with reference to the drawings.

Figure 1:
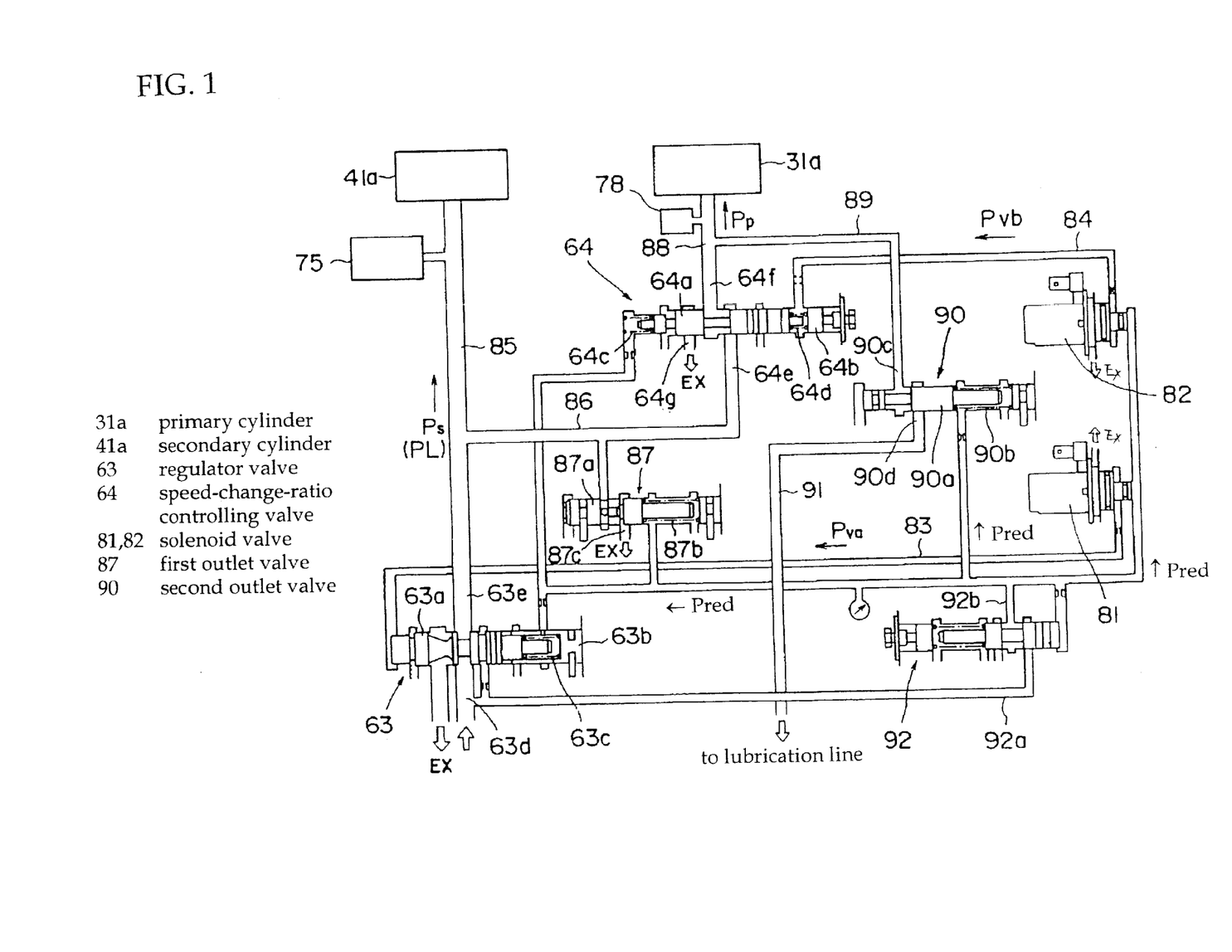
FIG. 1 is a view illustrating an oil-hydraulic circuit of a belt-type continuous variable speed-change transmission according to an embodiment of the present invention.
Figure 2:
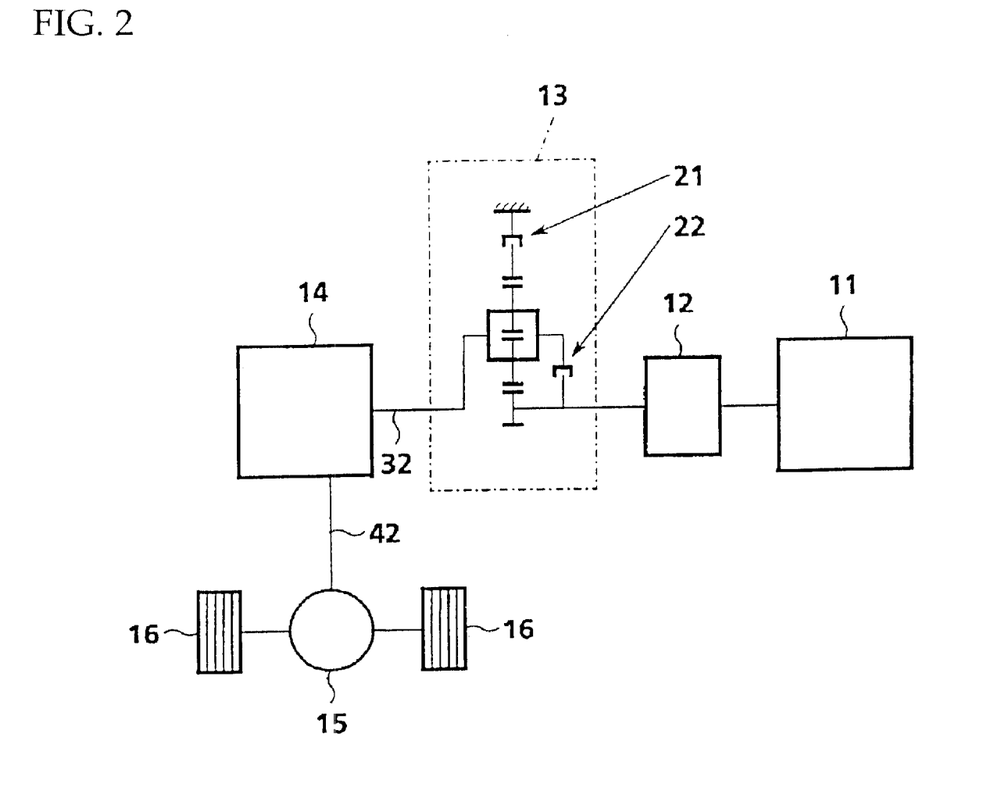
FIG. 2 is a schematic construction view illustrating a drive apparatus of the vehicle to which the belt-type continuous variable speed-change transmission of this embodiment is applied.

FIG. 1 illustrates the oil-hydraulic circuit of a belt-type continuous variable speed-change transmission according to an embodiment of the present invention; FIG. 2 illustrates a schematic construction of a drive apparatus of the vehicle to which the belt-type continuous variable speed-change transmission of this embodiment is applied; and FIG. 3 illustrates a schematic construction of the belt-type continuous variable speed-change transmission of this embodiment.

In the drive apparatus to which the belt-type continuous variable speed change transmission of this embodiment is applied, as illustrated in FIG. 2, it is arranged that the torque outlet from an engine (internal combustion engine) 11 be transmitted to the belt-type continuous variable speed change transmission 14 via a torque converter 12 and a normal-/reverse-rotation switching mechanism 13, and it is arranged that the torque be transmitted from this belt-type continuous variable speed-change transmission 14 to right and left drive wheels 16 via a front differential 15. The normal-/reverse-rotation switching mechanism 13 is intended for the purpose of switching from forward to backward movement or vice versa and has a reverse brake 21 and a forward clutch 22.

Figure 3:
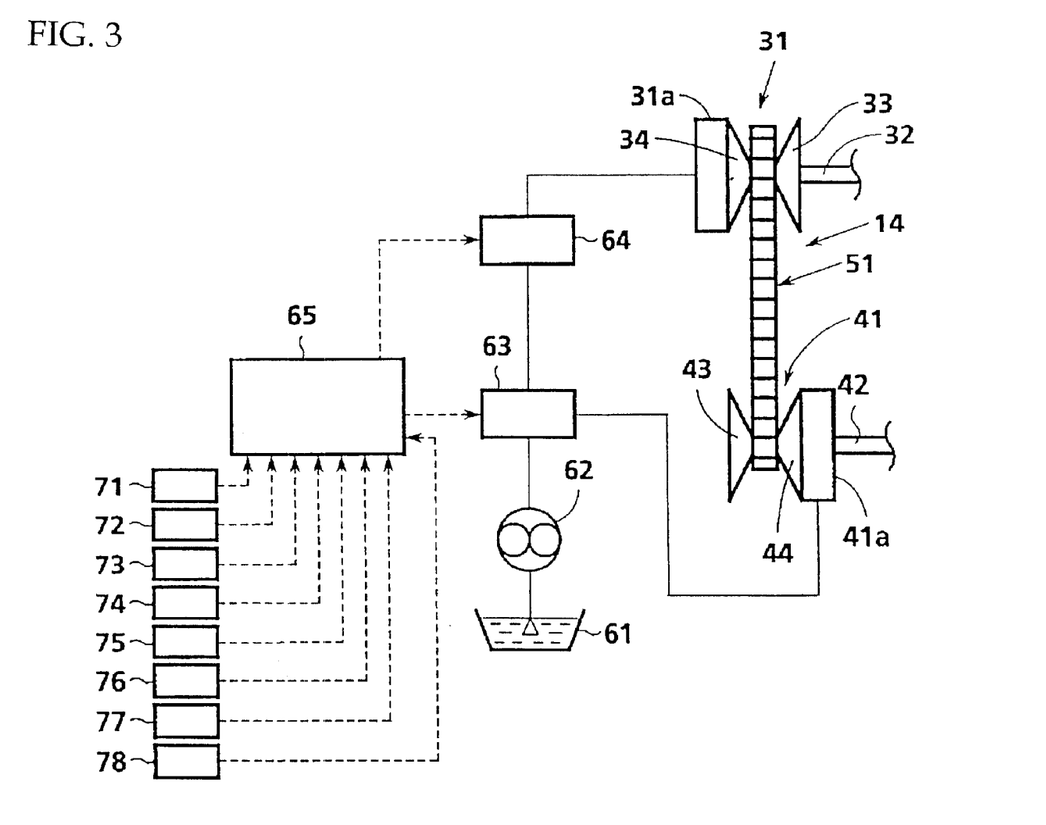
FIG. 3 is a schematic construction view illustrating the belt-type continuous variable speed-change transmission of this embodiment.

As illustrated in FIG. 3, the belt-type continuous variable speed-change transmission 14 comprises a primary pulley 31 connected to the outlet end of the engine 11, a secondary pulley 41 connected to the drive-shaft side of the vehicle, and a belt 51 stretched over both pulleys 31 and 41. The rotating force input from the normal-/reverse-rotation switching mechanism 13 to the primary shaft 32 is transmitted from the primary pulley 31 to the secondary pulley 41 via the belt 51 and is then transmitted to a secondary shaft 42.

Namely, the primary pulley 31 has a stationary sheave 33 and a movable sheave 34. A primary cylinder 31a is formed on a rear-surface side of the movable sheave 34. Accordingly, by the supplying or draining of an oil-hydraulic operating fluid of the primary cylinder 31a, it is possible to move the movable sheave 34 with respect to the stationary sheave 33 and thereby make variable the groove width of the pulley. On the other hand, similarly, the secondary pulley 41 has a stationary sheave 43 and a movable sheave 44. A secondary cylinder 41a is formed on the rear side of the movable sheave 44. Accordingly, by the supplying or draining of the oil-hydraulic operating fluid of the secondary cylinder 41a, it is possible to move the movable sheave 44 with respect to the stationary sheave 43 and thereby make variable the groove width of the pulley. In this case, the piston of the secondary cylinder 41a has its pressure-receiving area set to be at around 1/2 of that of the piston of the primary cylinder 31a.

The secondary cylinder 41a is applied thereto a secondary oil pressure Ps (line pressure PL) that has been adjusted by a regulator valve 63 serving as a pressure regulator valve that is the pressure-regulating element, while the primary cylinder 31a is applied thereto a primary oil pressure Pp that has been obtained by adjusting the line pressure PL by a speed-change-ratio controlling valve 64 that is the speed-change-ratio controlling element. An oil pan 61 cooperates with an oil pump 62 for supplying the oil within the oil pan 61 to one side of the regulator-valve 63.

The secondary oil pressure Ps (line pressure PL) and the primary oil pressure Pp are each controlled according to an instruction signal from an electronic control unit (ECU) 65. Namely, the ECU 65 is arranged to have input thereto detection signals from an engine revolution speed sensor (a crank angle sensor or a cam angle sensor) 71, a throttle opening sensor 72, a primary rotational-speed sensor 73 for sensing the rotational speed of the primary pulley 31, a secondary rotational-speed sensor 74 for sensing the rotational speed of the secondary pulley 41, a line-pressure sensor 75 for sensing the line pressure, a vehicle-speed sensor 76, a shift position sensor 77 for sensing the position of the shift lever, a primary-pressure sensor 78 for sensing the primary pressure, etc. It is arranged that the ECU 65 control the regulator valve 63 and the speed-change-ratio controlling valve 64 in the system of supplying the oil-hydraulic fluid to the respective pulleys 31 and 41 according to these detection signals. It is to be noted that, in place of the throttle-opening sensor 72, there may be used a sensor for sensing a parameter value indicating the load on the engine.

Here, the oil-hydraulic circuit of the belt-type speed-change transmission according to this embodiment will be explained. As illustrated in FIG. 1, the regulator valve 63 has spools 63a and 63b, between which there is disposed a spring 63c serving as a first urging-force-generating element. The speed-change-ratio-controlling valve 64 has spools 64a and 64b.

Between one end of the spool 64a and an end surface of the housing is disposed a spring 64c serving as a second urging-force-generating element while between the spools 64a and 64b is disposed a spring 64d.

An oil-hydraulic operating fluid introduction port 63d of the regulator valve 63 is connected to a discharge port of an oil-hydraulic pump 62 (shown in FIG. 3) while a discharge port 63e is connected to the secondary cylinder 41a and simultaneously is connected to an oil-hydraulic operating fluid introduction port 64e of the speed-change-ratio-controlling valve 64. Also, a discharge port 64f of the speed-change-ratio-controlling valve 64 is connected to the primary cylinder 31a.

Solenoid valves 81 and 82 that are first and second control elements, respectively, and that are used as first and second electromagnetic valves, respectively, control the regulator valve 63 and the speed-change-ratio-controlling valve 64. Namely, the solenoid valve 81 supplies a control pressure Pva to one side of the regulator valve 63 through a first operating-oil passage 83. Also, the solenoid valve 82 supplies a control pressure Pvb to one side of the speed-change-ratio-controlling valve 64 through a second operating-oil passage 84. It is to be noted that these solenoid valves 81 and 82 are each of a normally-closed-type valve. And it is arranged such that each of such solenoid valves be duty controlled through the operation of the ECU 65 (operation-controlling element) and be operated according to an amount of electricity supplied from the ECU 65. Further, it is arranged that as the amounts of electricity supplied to the solenoid valves 81 and 82 become smaller, i.e. as the action of the solenoid valves 81 and 82 becomes smaller, the control pressure Pva and the control pressure Pvb discharged from the solenoid valves 81 and 82 also become lower.

On the other hand, when it has been detected by the ECU 65 (failure-detecting element) that the ECU 65 itself, solenoid valves 81 and 82, various sensors, etc. are improperly functioning, the ECU 65 stops supplying electricity to the solenoid valves 81 and 82. As a result of this, the solenoid valves 81 and 82 decrease in operation, with the result that the respective control pressures Pva and Pvb of the solenoid valves 81 and 82 also decrease. As a result, the regulator valve 63 and the speed-change-ratio-controlling valve 64 are respectively moved by the spring pressure of the spring 63c and reducing pressure Pred, and by the spring pressure of the spring 64c and reducing pressure Pred. As a result, the oil-hydraulic operating fluid supplied to the secondary cylinder 41a is increased. On the other hand, the state of communication between the oil-hydraulic operating fluid introduction port 64e and the discharge port 64f of the speed-change-ratio-controlling valve 64 is maintained as is.

Further, on a branch passage 86 that branches from a midway position of a line pressure passage 85 that connects the discharge port 63e of the regulator valve 63 with the secondary cylinder 41a and that connects to the oil-hydraulic operating fluid introduction port 64e of the speed-change-ratio-controlling valve 64 there is disposed a first outlet valve 87. Also, on an operating-oil passage 88 that connects the discharge port 64f of the speed-change-ratio-controlling valve 64 with the primary pulley 31 there is disposed a second outlet valve 90 serving as oil-pressure-reducing means through a communication passage 89. The first outlet valve 87 has a spool 87a and a spring 87b for urging the spool 87a in a direction so that it prevents the oil from being drained from the first outlet valve 87. The second outlet valve 90 also has a spool 90a and a spring 90b for urging the spool 90a in a direction so that it prevents oil from being drained from the valve 90.

The set outlet pressure of the first outlet valve 87 is set to be at a level higher than that of the second outlet valve 90. Accordingly, even when the solenoid valves 81, 82, ECU 65, etc. are in order, in the case where the regulator valve 63 becomes inoperable due to a valve stick, etc. and there arises in the line-pressure passage 85 a line pressure P equal to or higher than the set value (the set outlet pressure of the first outlet valve 87), it becomes possible to decrease the line pressure PL through operation of the first outlet valve 87. On the other hand, even when a solenoid valve 81, 82, or ECU 65, etc. are out of order and the line pressure PL goes up, since the state of communication between the oil-hydraulic operating fluid introduction port 64e and the discharge port 64f of the speed-change-ratio-controlling valve 64 is maintained as is, the line pressure PL is decreased by the second outlet valve 90. An unnecessary rise in the level of the line pressure PL is thereby prevented.

Here, as a result of the disposition of the second outlet valve 90 on the operating-oil passage 88 between the speed-change-ratio controlling valve 64 and the primary cylinder 31a, even at the time of normal travel, no oil pressure equal to or higher than the set outlet pressure of the second outlet valve 90 acts upon the primary cylinder 31a. In the continuous variable speed-change transmission in which it is possible for the same oil pressure to be supplied to the primary cylinder 31a and secondary cylinder 41a, the case where the highest line pressure acts upon the primary cylinder 31a for some reason or other is to be considered, although such a case should never be allowed to occur.

Further, in a type of continuous variable speed-change transmission wherein the piston pressure-receiving area of the primary pulley 31 is made larger than that of the secondary pulley 41, a force greater than that acting upon the secondary pulley 41 acts upon the primary pulley 31. Therefore, it is necessary to increase the strength of the primary pulley side. However, such parts design where prevention of malfunctioning is also taken into consideration leads to an increase in the cost, and therefore such designing is not appropriate.

However, in the construction of this embodiment, owing to the second outlet valve 90 provided between the speed-change-ratio-controlling valve 64 and the primary cylinder 31a, the increase in the line pressure PL is prevented. Therefore, it is possible to design the primary pulley 31 side to be at a strength value conforming to the set outlet pressure of the second outlet valve 90. This eliminates the necessity of making a "high-spec" design for which a great increase in the line pressure PL is prepared, thereby enabling a reduction in the cost.

Also, an outlet passage 91 of the second outlet valve 90 is connected to a lubrication passage (not illustrated) of the continuous variable speed-change transmission. Accordingly, because at the time when a failure occurs in the ECU 65, etc. the line pressure PL is conjectured to become the highest possible, the oil-hydraulic operating fluid outlet from the regulator valve 63 is decreased to become somewhat deficient in lubrication. However, since the operating oil outlet from the second outlet valve 90 is supplementally supplied to the lubrication passage through the outlet passage 91, it is possible to prevent the seizure of the portions such as the normal-/reverse-rotation switching mechanism 13 which should be lubricated.

Additionally, in FIG. 1, the line pressure PL that has been adjusted by the regulator valve 63 is led to the introduction port 92a of a reducing valve 92. The reducing pressure Pred that has been obtained by decreasing the line pressure PL with the reducing valve 92 is supplied to the regulator valve 63, speed-change-ratio-controlling valve 64, and outlet valves 87, 90 through the discharge port 92b. And it is thereby arranged that the prescribed control pressure acts upon each of those valves. Especially, the reducing pressure Pred supplied to the regulator valve 63 acts upon the regulator valve 63 so as to urge this valve 63 in the direction (the leftward direction in FIG. 1) causing an increase in the secondary pressure Ps (line pressure PL) supplied to the secondary cylinder 41a, as the spring 63c does.

Also, the reducing pressure Pred supplied to the speed-change-ratio-controlling valve 64 acts upon the speed-change-ratio-controlling valve 64 so as to urge this valve 64 in the direction (the rightward direction in FIG. 1) causing an increase in the primary pressure Pp supplied to the primary cylinder 31a, i.e. the direction causing an increase in the amount of the line pressure PL regulated by the regulator valve 63 and supplied to the primary cylinder 31a, as the spring 64c does.

Also, the reducing pressure Pred serves as the base pressure for each of the solenoid valves 81 and 82.

The operation of the belt-type continuous variable speed-change transmission of this embodiment will now be explained.

The solenoid valves 81 and 82 are duty controlled according to the instruction from the ECU 65 based on the operational condition of the vehicle, and outlet the control pressures Pva and Pvb.

The regulator valve 63 adjusts the discharge pressure of the oil-hydraulic pump 62 to the secondary oil pressure Ps (line pressure PL), based on the control pressure Pva, the spring pressure of the spring 63c, the reducing pressure Pred from the reducing valve 92, etc., and outlets the resulting pressure to the line-pressure passage 85. When the control pressure Pva from the solenoid valve 81 is high, the spool 63a is urged to the right in the illustration against the spring pressure of the spring 63c and the reducing pressure Pred. As a result, the state of communication between the oil-hydraulic operating fluid introduction port 63d and the discharge port 63e is contracted, with the result that the secondary pressure Ps (line pressure PL), which is the oil pressure supplied to the secondary cylinder 41a, is reduced. On the other hand, when the control pressure Pva is low, the spool 63a is urged to the left in the illustration by the spring pressure of the spring 63c and the reducing pressure Pred. As a result, the state of communication between the oil-hydraulic operating fluid introduction port 63d and the discharge port 63e is expanded, with the result that the secondary pressure Ps (line pressure PL), which is the oil pressure supplied to the secondary cylinder 41a, is increased.

On the other hand, the speed-change-ratio-controlling valve 64 adjusts the line pressure PL to a prescribed primary oil pressure Pp based on the control pressure Pvb, the spring pressures of the springs 64c and 64d, the reducing pressure Pred from the reducing valve 92, etc., and discharges the resulting pressure to the operating-oil passage 88. When the control pressure Pvb from the solenoid valve 82 is high, the spool 64a is urged to the left in the illustration against the spring pressure of the spring 64c and the reducing pressure Pred. As a result, the communication between the oil-hydraulic operating fluid introduction port 64e and the discharge port 64f of the speed-change-ratio-controlling valve 64 is cut off while, at the same time, the discharge port 64f and the outlet port 64g are communicated with each other. The operating oil of the primary cylinder 31a is outlet.

Conversely, when the control pressure Pvb of the solenoid valve 82 becomes low, the spool 64a of the speed-change-ratio-controlling valve 64 is urged to the right in the illustration by the spring pressure of the spring 64c and the reducing pressure Pred. As a result, the outlet port 64g is cut off while, at the same time, the oil-hydraulic operating fluid introduction port 64e and the discharge port 64f are communicated with each other. And, as the control pressure Pvb becomes lower, the state of communication between the port 64e and the port 64f is more expanded. As a result, the amount of the line pressure PL, that has been regulated by the regulator valve 63, and that is supplied to the primary cylinder 31a, is increased, with the result that the primary oil pressure Pp becomes high. This primary pressure Pp is supplied to the primary cylinder 31a.

Also, even when the solenoid valves 81, 82, ECU 65, various sensors, etc. are normally in order, it is possible that valve sticking, etc. occurs in the regulator valve 63 due to the dust, etc. that has entered the oil and thus a line pressure PL that is higher than the set value, occurs. However, this line pressure PL is reduced through the operation of the first outlet valve 87 disposed on the branch passage 86. Due to the line pressure PL that has become high, the spool 87a is moved to the right in the illustration against the spring pressure of the spring 87b. Then, the branch passage 86 and the outlet port 87c of the first outlet valve 87 become communicated with each other. As a result, the line pressure PL that has become abnormally high is drained through this outlet port 87c, with the result that an abnormal rise in the line pressure PL is prevented.

Now, assume that, during the travel of the vehicle, the solenoid valve 81 has malfunctioned, e.g. has undergone breakage of its wire. Then, the ECU 65 detects the wire breakage of the solenoid valve 81 and stops controlling all solenoid valves. Since each of the both solenoid valves 81 and 82 is of a normally-closed-type, when control is stopped the respective control pressures Pva and Pvb become zero. Therefore, in the regulator valve 63, the spool 63a is moved to the left in the illustration due to the spring pressure of the spring 63c, whereby adjustment of the pressure is made so that the secondary oil pressure Ps (line pressure PL) increases to the maximum.

On the other hand, in the speed-change-ratio-controlling valve 64, the spool 64a is moved to the right in the illustration due to the spring pressure of the spring 64c and the reducing pressure Pred. As a result, the oil-hydraulic operating fluid introduction port 64e and the discharge port 64f are brought to the state of mutual communication, whereby the line pressure PL, which had been regulated by the regulator valve 63, continues to be supplied to the primary cylinder 31a. The maximum line pressure, which had been regulated by the regulator valve 63, is caused to act upon the primary cylinder 31a directly.

However, because the second outlet valve 90 is disposed in the communication passage 89 branching from the midway of the operating-oil passage 88, the maximum line pressure supplied to the primary cylinder 31a acts upon the port 90c of the second outlet valve 90. As a result, the spool 90a is pushed to the right in the illustration against the spring 90b. Then, the port 90c and the port 90d become communicated with each other. But, because the port 90d is the outlet port connected to the portions where lubrication is necessary, the maximum line pressure is reduced to a prescribed pressure by the second outlet valve 90. This pressure-reduced operating oil is then supplied to the primary cylinder 31a. It is to be noted that that prescribed pressure is set as the minimum necessary pressure at which no slip occurs of the belt 51.

Accordingly, the line pressure PL is ensured to be at least a minimum necessary level capable of preventing the slip of the belt. As a result, it is possible to decrease the loss of drive power to the oil pump and, even at the time of a failure, to reduce the consumption of the fuel.

On the other hand, in the regulator valve 63, the line pressure PL is reliably adjusted so that this pressure PL may have the highest level, as a result of the stoppage of control by the solenoid valve 81. However, because the line pressure PL is reduced to the prescribed pressure by the second outlet valve 90 through the speed-change-ratio-controlling valve 64 with which the branch passage 86 (oil-hydraulic operating fluid introduction port 64e) and the operating-oil passage 88 (discharge port 64f) are kept in the state of mutual communication, the line pressure PL that has been reduced to that prescribed pressure is supplied to the secondary cylinder 41a as well.

Also, in this way, it results that the line pressure, the same in level, is supplied to the primary cylinder 31a and to the secondary cylinder 41a. However, because the piston pressure-receiving area of the primary cylinder 31a is set at a value approximately twice as large as that of the secondary cylinder 41a, the groove width of the primary pulley 31 is narrower and that of the secondary pulley 41 is wider. Accordingly, the change-of-speed ratio is adjusted to the over-drive (OD) side. For this reason, for example, even when a failure occurs during high-speed driving, because the change-of-speed ratio is OD, it is possible to prevent the over-fast revolution of the engine.

Further, in the construction of this embodiment, by stopping control by the solenoid valves 81, 82 when a failure has occurred, the control logic executed for fail-safe operation is simplified. On the other hand, because, at the same time, the maximum line pressure adjusted by the regulator valve 63 is also reduced by the second outlet valve 90, and for that reason the design specifications of the primary pulley 31 side can be at values ordinarily used heretofore. It is thereby advantageously possible to suppress the cost.

Also, when a failure is detected, the oil-hydraulic operating fluid supplied to the secondary cylinder 41a is increased due to the spring pressure of the spring 63c and the reducing pressure Pred in the regulator valve 63. And, on the other hand, there continues to be supplied to the primary cylinder 31a the line pressure PL due to the oil-hydraulic operating fluid introduction port 64e and discharge port 64f of the speed-change-ratio-controlling valve 64 being communicated with each other due to the spring pressure of the spring 64c and reducing pressure Pred in the speed-change-ratio-controlling valve 64. Since, in this way, the oil-hydraulic circuit is constructed without separately providing any special control valves for fail-safe operations, the oil-hydraulic circuit can be simplified and therefore reduced in cost.

Further, at the time when a failure occurs in the solenoid valve 81, the regulator valve 63 operates such that the line pressure PL may be made the highest. As a result the amount of the oil discharged from the regulator valve 63 decreases and becomes insufficient for lubrication. However, because the operating oil drained from the second outlet valve 90 is supplemented to the lubrication passage through the outlet passage 91, it is possible thereby to prevent the seizure of the portions where lubrication is necessary.

Additionally, in the foregoing description, an explanation has been given of an example wherein the fail-safe operation element for maximizing the line pressure and simultaneously causing the line pressure PL to continue to be supplied to the primary cylinder 31a at the time of a failure of the solenoid valve 81 is made of the springs 63c, 64c and the reducing pressure Pred. However, this fail-safe operation element may be made only of either the springs 63c, 64c or the reducing pressure Pred, or be made of other elements.

Further, in the foregoing description, an explanation has been given of a case where a failure has occurred in the solenoid valve 81 during the driving of the vehicle. However, in any case where a failure has occurred in the solenoid valve 82 or a case where a failure has occurred in the ECU 65, various sensors, etc., the control by the solenoid valves 81, 82 is stopped to make zero each of the control pressures Pva, Pvb. Therefore, the operation becomes the same as that stated above.

As has been explained in detail in the above-described embodiment, according to the oil-hydraulic circuit of the belt-type continuous variable speed-change transmission of the present invention, when a failure is detected, the slip of the belt can be prevented by increasing the oil-hydraulic operating fluid supplied to the secondary cylinder. Also, the operating oil, the pressure of which has been regulated by the pressure-regulating element, is maintained while it is supplied to the primary cylinder. By maintaining this supply, the same high oil pressure is supplied to the secondary pulley and the primary pulley. However, the secondary pulley is constructed to have a piston pressure-receiving area equal to or smaller than that of the primary pulley and, therefore, the change-of-speed ratio is made to be a value equal to or smaller than 1. For this reason, even when a failure occurs during high-speed driving, the engine is prevented from making over-fast revolution to thereby prevent the breakage of the engine.

What is claimed:

1. An oil-hydraulic circuit of a continuous variable speed-change transmission having a primary pulley connected to an input shaft side, a secondary pulley connected to an output shaft side, and a belt stretched over both pulleys and enabling the transmission of power between the both pulleys, the oil-hydraulic circuit, comprising:

an oil-hydraulic secondary cylinder that makes variable a groove width of the secondary pulley by receiving a secondary oil pressure;

an oil-hydraulic primary cylinder that makes variable a groove width of the primary pulley by receiving a primary oil pressure, the oil-hydraulic primary cylinder being formed such that a pressure-receiving area thereof is larger than that of the secondary cylinder;

whereby, by supplying and exhausting an oil-hydraulic operating fluid with respect to each of the cylinders, the groove width of either the primary pulley or the secondary pulley is changed relative to the groove width of the other thereof to thereby cause a change in speed, the oil-hydraulic circuit further including, a pressure-regulating element for regulating hydraulic pressure discharged from an oil pump to the secondary oil pressure and supplying the secondary oil pressure to the secondary cylinder;

a first control element that controls the pressure-regulating element to vary the secondary oil pressure;

a speed-change-ratio-controlling element supplied with the secondary oil pressure and regulates the secondary oil pressure to the primary oil pressure and supplies the primary oil pressure to the primary cylinder;

a second control element that controls the speed-change-ratio-controlling element to vary the primary oil pressure;

an operation-controlling element that operationally controls the first control element and the second control element according to the state of operation of a vehicle;

a failure-detecting element that detects a failure of at least one of the first control element, the second control element, and the operation-controlling element;

a fail-safe operation element that, when the failure-detecting element detects a failure, limits operation of the first control element such that the pressure-regulating element increases the secondary oil pressure supplied to the secondary cylinder, and further limits operation of the second control element such that the secondary oil pressure is supplied to the primary cylinder as the primary oil pressure through the speed-change-ratio-controlling element; and an oil-pressure-reducing element that regulates the primary oil pressure to a predetermined value in response to an actual primary oil pressure being applied to said primary cylinder when the actual primary oil pressure exceeds the predetermined value.

2. The oil-hydraulic circuit of a continuous variable speed-change transmission as set forth in claim 1, wherein said oil-pressure-reducing element is disposed in the oil passage between the pressure-regulating element and the primary cylinder.

3. The oil-hydraulic circuit of a continuous variable speed-change transmission as set forth in claim 2, wherein the oil-pressure-reducing element is disposed between the speed-change-ratio-controlling element and the primary cylinder and regulates the primary oil pressure in response to an actual primary oil pressure being applied to said primary cylinder.

4. The oil-hydraulic circuit of a continuous variable speed-change transmission as set forth in claim 2, wherein the oil-pressure-reducing element includes a first outlet valve disposed between the pressure-regulating element and the speed-change-ratio-controlling element and a second outlet valve disposed between the speed-change-ratio-controlling element and the primary cylinder, and wherein a set outlet pressure of the first outlet valve is higher than a set outlet pressure of the second outlet valve.

5. The oil-hydraulic circuit of a continuous variable speed-change transmission as set forth in claim 2, wherein an outlet passage of the oil-pressure-reducing element is connected to a lubrication passage.

6. The oil-hydraulic circuit of a continuous variable speed-transmission as set forth in claim 2, wherein there are solely a first and second control element.

7. The oil-hydraulic circuit of a continuous variable speed-change transmission as set forth in claim 1, wherein the pressure-regulating element is constructed such that, when the first control element becomes less active, the secondary oil pressure applied to the -secondary cylinder is increased, wherein the speed-change-ratio-controlling element is constructed such that, when the second control element becomes less active, the primary oil pressure applied to the primary cylinder is increased, and wherein when the failure-detecting element has detected a failure, the fail-safe operation element reduces action of the first control element and that of the second control element.

8. The oil-hydraulic circuit of a continuous variable speed-change transmission as set forth in claim 7, wherein the first control element is a first electromagnetic valve that discharges a control pressure according to the amount of electrical power supplied from the operation-controlling element, the second control element is a second electromagnetic valve that discharges the control pressure according to the amount of electrical power supplied from the operation-controlling element, the pressure-regulating element is a pressure-regulating valve, and the speed-change-ratio-controlling element is a speed-change-ratio-controlling valve, whereby, the control pressure discharged from the first electromagnetic valve is applied to one side of the pressure-regulating valve through a first operating-oil passage such that the pressure-regulating valve is controlled according to the control pressure from the first electromagnetic valve, while the control pressure discharged from the second electromagnetic valve is applied to one side of the speed-change-ratio-controlling valve through a second operating-oil passage such that the speed-change-ratio-controlling valve is controlled according to the control pressure from the second electromagnetic valve, and the fail-safe operation element includes a first urging-force generator disposed in the other side of the pressure-regulating valve and that generates an urging force resisting the control pressure of the first electromagnetic valve thereby as the control pressure from the first electromagnetic valve reduces, the secondary oil pressure supplied to the secondary cylinder increases, and a second urging-force generator disposed in the other side of the speed-change-ratio-controlling valve and that generates an urging force resisting the control pressure of the second electromagnetic valve thereby as the control pressure of the second electromagnetic valve decreases, the primary oil pressure regulated by the pressure-regulating valve and applied to the primary cylinder increases.

9. A hydraulic circuit for a cotinuous variable speed-change transmission, comprising:

a primary cylinder that varies a groove width of a primary pulley by receiving a primary oil pressure;

a secondary cylinder that varies a groove width of a secondary pulley by receiving a secondary oil pressure;

a pressure-regulating element that regulates pressure from an oil pump to the secondary oil pressure;

a first control element that controls the pressure-regulating element to vary the secondary oil pressure;

a speed-change-ratio-controlling element that receives the secondary oil pressure and converts the secondary oil pressure to the primary oil pressure;

a second control element that controls the speed-change-ratio-controlling element to vary the primary oil pressure;

an operation-controlling element that controls the first control element and the second control element according to the state of operation of a vehicle;

a failure-detecting element that detects a failure of at least one of the first control element, the second control element, and the operation-controlling element;

a fail-safe operation element that, when the failure-detecting element detects a failure, limits operation of the first control element such that the pressure-regulating element increases the secondary oil pressure supplied to the secondary cylinder, and further limits operation of the second control element such that the secondary oil pressure is supplied to the primary cylinder as the primary oil pressure through the speed-change-ratio-controlling element; and a pressure-reducing element that regulates the primary oil pressure to a predetermined value in response to an actual primary oil pressure being applied to said primary cylinder when the actual primary oil pressure exceeds the predetermined value.

* * * * *